(12) United States Patent
Kimura et al.

(10) Patent No.: US 7,551,125 B2
(45) Date of Patent: Jun. 23, 2009

(54) POSITIONING SYSTEM, INFORMATION SUPPLY APPARATUS, TERMINAL APPARATUS, CONTROL METHOD OF TERMINAL APPARATUS, CONTROL PROGRAM FOR TERMINAL APPARATUS AND COMPUTER READABLE RECORDING MEDIUM FOR STORING CONTROL PROGRAM FOR TERMINAL APPARATUS

(75) Inventors: Akira Kimura, Matsumoto (JP); Tomoyuki Kurata, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 101 days.

(21) Appl. No.: 11/438,264

(22) Filed: May 23, 2006

(65) Prior Publication Data

US 2006/0267835 A1    Nov. 30, 2006

(30) Foreign Application Priority Data

May 25, 2005    (JP)    ............................. 2005-151896

(51) Int. Cl.
G01S 1/00    (2006.01)
(52) U.S. Cl. ................................. 342/357.02
(58) Field of Classification Search ................................
342/357.01–357.17
See application file for complete search history.

(56) References Cited

U.S. PATENT DOCUMENTS

| | | | |
|---|---|---|---|
| 3,801,981 A | 4/1974 | Alpers | |
| 5,757,786 A | 5/1998 | Joo | |
| 6,603,978 B1 | 8/2003 | Carlsson et al. | |
| 6,684,158 B1 | 1/2004 | Garin et al. | |
| 7,095,368 B1 * | 8/2006 | van Diggelen | 342/357.01 |
| 2002/0167441 A1 * | 11/2002 | McBurney et al. | 342/357.03 |
| 2003/0197638 A1 | 10/2003 | Bloebaum et al. | |
| 2007/0123248 A1 * | 5/2007 | Krasner et al. | 455/422.1 |

FOREIGN PATENT DOCUMENTS

| | | |
|---|---|---|
| JP | S61-000771 A | 1/1986 |
| JP | 2002-090441 | 3/2002 |
| JP | 2002-357652 A | 12/2002 |
| JP | 2004-507186 A | 3/2004 |

OTHER PUBLICATIONS

Ruffini S: "Network Synchronization-Stand-Alone Products That Support the Design of Synchronization Networks", 2004, Ericsson review (incl. on), Ericsson, Stockholm, SE, pp. 32-41, XP001217355. ISSN:0014-0171, the whole document.

* cited by examiner

Primary Examiner—Thomas H Tarcza
Assistant Examiner—Nga X Nguyen
(74) Attorney, Agent, or Firm—Global IP Counselors, LLP

(57) ABSTRACT

A positioning system includes: a terminal apparatus and an information supply apparatus capable of communicating with the terminal apparatus. The information supply apparatus includes: external timing signal generating means for generating an external timing signal constituted by external events; satellite time information generating means; external timing signal correcting means; and transmitting time information generating means. The terminal apparatus includes: communicating means; terminal timing signal generating means for generating a terminal timing signal constituted by internal events; clock number recording means; interevents clock number information generating; time difference information generating means for generating time difference information which indicates times between reception of the external events and generation of the internal events based on the interevents clock number information; and internal time information generating means for generating internal time information.

3 Claims, 9 Drawing Sheets

F I G. 2
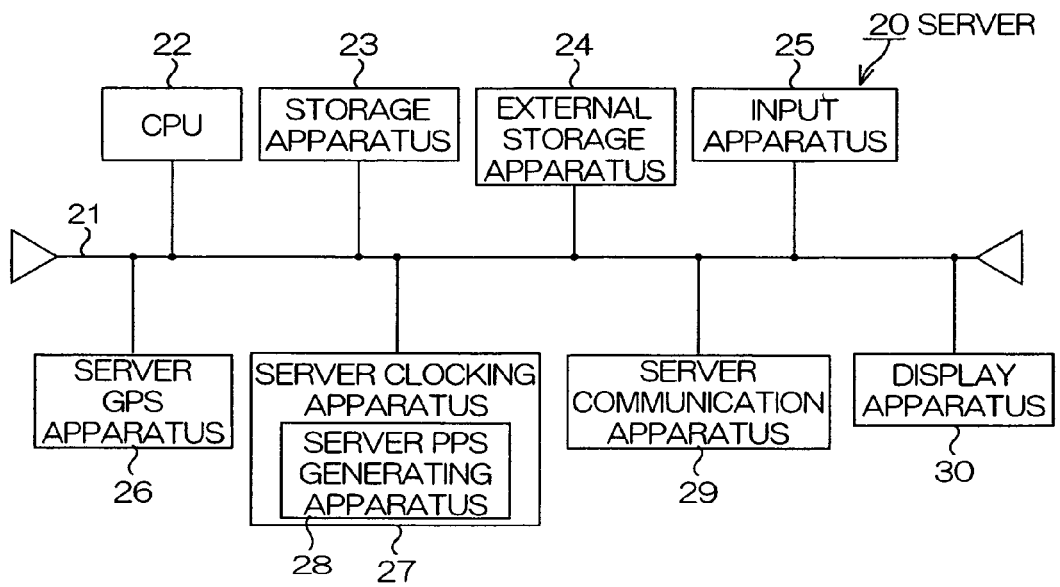
F I G. 3
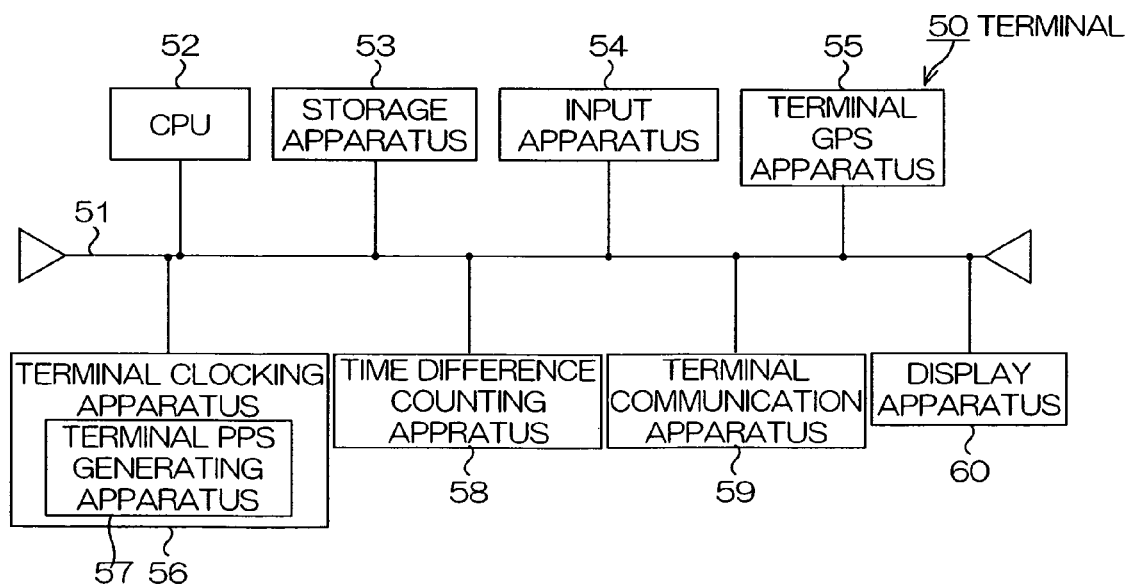

F I G. 5
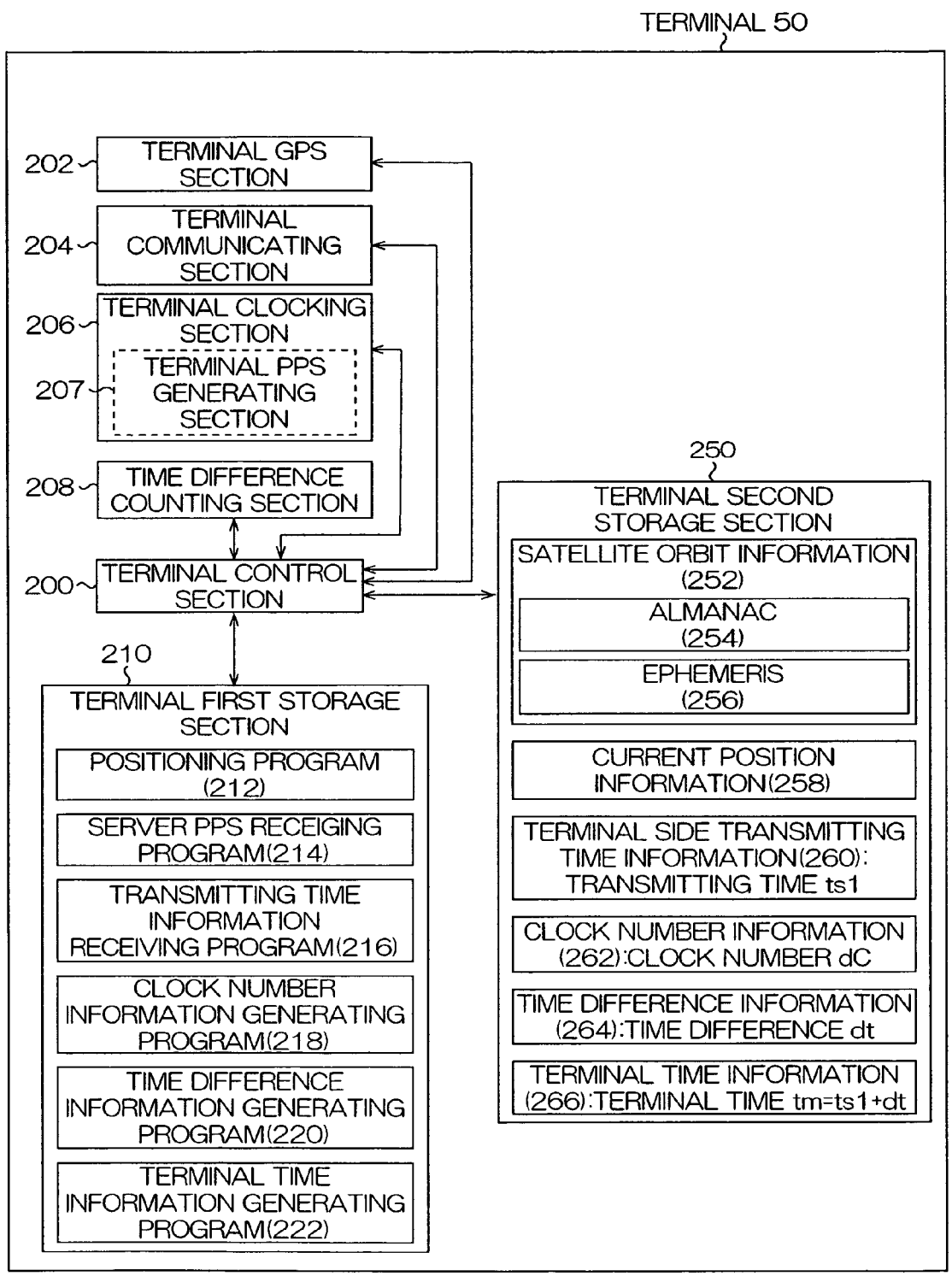

F I G. 6
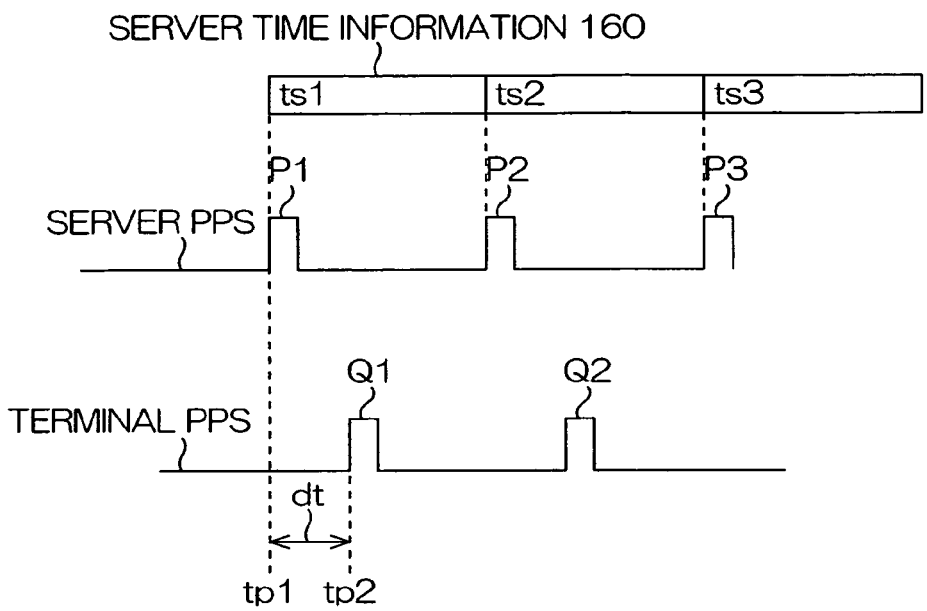
FREQUENCY OF TIME DIFFERENCE COUNTER=H1 (54.912MHz)
1 CLOCK=18.21ns(=1/54.912MHz)
dt=CLOCK NUMBER dC×18.21ns
F I G. 7
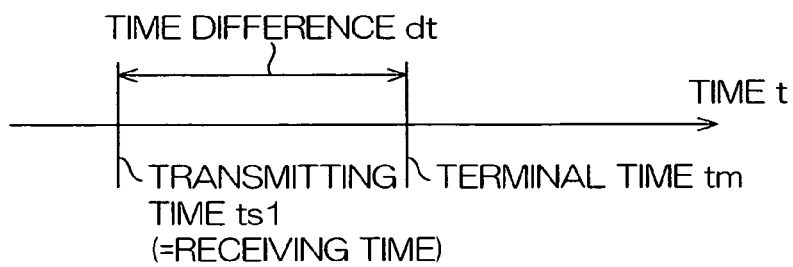

1 SECOND BASED ON GPS TIME

ESTIMATED CLOCK NUMBER: C1

CLOCK NUMBER BY TIME DIFFERENCE COUNTING APPRATUS BETWEEN PO1 AND PO2: C2

DRIFT dr=C1-C2

CORRECTED CLOCK NUMBER dCR=dC+(dC/C1)×dr

POSITIONING SYSTEM, INFORMATION SUPPLY APPARATUS, TERMINAL APPARATUS, CONTROL METHOD OF TERMINAL APPARATUS, CONTROL PROGRAM FOR TERMINAL APPARATUS AND COMPUTER READABLE RECORDING MEDIUM FOR STORING CONTROL PROGRAM FOR TERMINAL APPARATUS

This application claims the priorities benefit under 35 U.S.C.§ 119 of Japanese Patent Application No. 2005-151896 filed on May 25, 2005, which is hereby incorporated in its entirety by reference.

BACKGROUND

1. Technical Field

The present invention relates to a positioning system which uses signals from positioning satellites, an information supply apparatus, a terminal apparatus, a control method of the terminal apparatus, a control program for the terminal apparatus, and a computer readable recording medium for storing the control program for the terminal apparatus.

2. Related Art

Conventionally, positioning systems for positioning a current position of each GPS (Global Positioning System) receiver using a satellite navigation system such as GPS have been used.

Such GPS receiver calculates, for example, the distance (hereinafter, referred to as pseudo range) between each GPS satellite and the GPS receiver based on the difference (hereinafter, referred to as delay time) between times when a signal is transmitted from each GPS receiver and the signal is received by the GPS receiver based on signals from four observable GPS satellites at the current time. The respective positions of each GPS satellite at the current time are then calculated by orbit information of each GPS satellite (hereinafter, referred to as ephemeris), thereby positioning the current position using the positions of each GPS satellite on the orbit and the above-mentioned pseudo range. This positioning allows obtainment of positioning positions defined by a latitude, a longitude, and an altitude, for example.

As mentioned above, times are necessary for positioning using GPS. However, it takes large costs and power consumption to provide a clock to measure correct time and keep the correct time.

With respect to this, a technique to reduce initial positioning time by calculating observable GPS satellites based on time information obtained from a RTC (Real Time Clock) or time information obtained from standard radio waves when the GPS receiver is turned on has been proposed (e.g., JP-A-2002-90441 (FIG. 2 and the like)).

However, there is a problem that since the RTC calculates the current time by counting clock counts after turning off the GPS at the last time, the accuracy of the RTC times used to calculate observable GPS satellites is sufficient, but that used to position may be insufficient. In addition, in order to receive standard radio waves, for example, an antenna and hardware different from a communication apparatus for a cellular phone must be provided separately.

SUMMARY

Therefore, an advantage of some aspects of the invention is to provide a positioning system which allows obtainment of time information with high time accuracy, an information supply apparatus, a terminal apparatus, a control method of the terminal apparatus, a control program for the terminal apparatus, and a computer readable recording medium for storing the control program for the terminal apparatus even though there is no need for the terminal apparatus to provide specific hardware to receive a correct clock and standard radio waves.

In order to achieve the above object, a positioning system according to a first aspect of the invention includes: a terminal apparatus for positioning based on satellite signals from positioning satellites, and an information supply apparatus capable of communicating with the terminal apparatus, wherein the information supply apparatus has: external timing signal generating means for generating an external timing signal constituted by external events generated at predetermined time intervals, satellite time information generating means for generating satellite time information which indicates satellite times of the positioning satellites based on the satellite signals, external timing signal correcting means for correcting the timing of generating the external events based on the satellite time information, and transmitting time information generating means for generating transmitting time information which indicates the satellite times when the external events are transmitted, and the terminal apparatus has: communicating means for communicating with the information supply apparatus, terminal timing signal generating means for generating a terminal timing signal constituted by internal events generated at predetermined time intervals, clock number recording means for generating predetermined number of clocks per unit time and recording the number of generated clocks, interevents clock number generating means for generating interevents clock number information which indicates the number of clocks between reception of the external events of the external timing signal and generation of the internal events of the terminal timing signal, time difference information generating means for generating time difference information which indicates times between reception of the external event and generation of the internal event based on the interevents clock number information, and internal time information generating means for generating internal time information which indicates the times when the internal events are generated based on the transmitting time information and the time difference information.

With the structure according to the first aspect of the invention, the information supply apparatus can correct the timing of generating the external events based on the satellite time information using the external timing signal correcting means. This allows the information supply apparatus to, for example, generate the external timing signal constituted by the external events generated for every one second of the satellite time.

In addition, the information supply apparatus can generate transmitting time information which indicates the satellite time corresponding to the external events using the transmitting time information generating means.

The information supply apparatus can communicate with the terminal apparatus, allowing transmission of the external timing signal and the transmitting time information to the terminal apparatus.

On the other hand, the terminal apparatus can receive the external timing signal using the communicating means.

The terminal apparatus can generate interevents clock number information which indicates the number of clocks between reception of the external events and generation of the internal events using the interevents clock number information generating means.

The terminal apparatus can generate the time difference information using the time difference information generating means. The time difference information indicates times between reception of the external events and generation of the internal events. Accordingly, when the external event is received first, and then the internal event is generated, for example, the internal event is generated at the time point when the time indicated in the time difference information has elapsed after receiving the external event. Therefore, if the time at which the certain external event is received is already known, the time at which an internal event is generated can be calculated based on the time and the time difference information.

At this point, the terminal apparatus can receive the transmitting time information using the communicating means. Here, the terminal apparatus assumes that the times indicated in the transmitting time information are the times at which the external events are received.

The terminal apparatus can generate internal time information which indicates times at which the internal events are generated based on the transmitting time information and the time difference information using the internal time information generating means.

The time difference information can provide time accuracy equivalent to that of the satellite time by increasing the number of clocks per unit time of the clock generating means.

Accordingly, the time indicated in the internal time information may provide accuracy equivalent to the satellite time.

Here, since the external timing signal and the transmitting time information can be transmitted by putting on the radio waves of cellular phones, for example, the terminal apparatus can receive it using the communication apparatus, and there is no need to provide specific hardware.

Accordingly, the positioning system allows the terminal apparatus to obtain time information with high time accuracy even though there is no need to provide specific hardware to receive correct clocks and standard radio waves.

In order to achieve the above object, an information supply apparatus capable of communicating with a terminal apparatus for positioning based on satellite signals from positioning satellites according to a second aspect of the invention includes: external timing signal generating means for generating an external timing signal constituted by external events generated at predetermined time intervals, satellite time information generating means for generating satellite time information which indicates satellite times of the positioning satellites based on the satellite signals, external timing signal correcting means for correcting the timing of generating the external events based on the satellite time information, transmitting time information generating means for generating transmitting time information which indicates the satellite times when the external events are transmitted, external timing signal transmitting means for transmitting the external timing signal to the terminal apparatus, and transmitting time information transmitting means for transmitting the transmitting time information to the terminal apparatus.

With the structure according to the second aspect of the invention, the external timing signal and the transmitting time information, which are used as a standard for the terminal apparatus to calculate the times at which the internal events are generated, can be transmitted to the terminal apparatus.

In order to achieve the above object, a terminal apparatus for positioning based on satellite signals from positioning satellites according to a third aspect of the invention includes: communicating means for communicating with the outside, external timing signal receiving means for receiving an external timing signal constituted by external events generated at predetermined time intervals measured by times of the positioning satellites, transmitting time information receiving means for receiving transmitting time information which indicates times when the external events are transmitted measured by the times of the positioning satellites, terminal timing signal generating means for generating a terminal timing signal constituted by internal events generated at predetermined time intervals, clock generating means for generating predetermined number of clocks per unit time and recording the number of generated clocks, interevents clock number information generating means for generating interevents clock number information which indicates the number of clocks between reception of the external events of the external timing signal and generation of the internal events of the terminal timing signal, time difference information generating means for generating time difference information which indicates times between reception of the external events and the generation of the internal events based on the interevents clock number information, and internal time information generating means for generating internal time information which indicates times when the internal events are generated based on the transmitting time information and the time difference information.

With the structure according to the third aspect of the invention, as with the terminal apparatus according to the first aspect of the invention, the terminal apparatus can obtain time information with high time accuracy even though there is no need for the terminal apparatus to provide specific hardware.

A fourth aspect of the invention is a terminal apparatus with the structure according to the third aspect of the invention, including: estimated clock number information generating means for generating estimated clock number information which indicates estimated clock number to be generated during receiving sequential two external events, actual clock number information generating means for generating actual clock number information which indicates actual clock number generated during receiving sequential two external events, drift information generating means for generating drift information which indicates drift of the clock generating means based on the estimated clock number information and the actual clock number information, and corrected clock number information generating means for correcting the interevents clock number information and generating the corrected clock number information based on the drift information, wherein the time difference information generating means generates the time difference information based on the corrected clock number information.

The number of clocks per unit time generated from the clock generating means changes due to temperature. The change in the number of clocks per unit time is referred to as drift.

When drift occurs, the number of clocks indicated in the interevents clock number information deviates from the estimated clock number.

Here, when the time difference information generating means generates the time difference information based on the interevents clock number information without calculating drift, the accuracy of the time difference information decreases, and the accuracy of the internal time information also decreases.

At this point, with the structure according to the fourth aspect of the invention, the terminal apparatus can correct the interevents clock number information and generate the corrected clock number information based on the drift information using the corrected clock number information generating means.

The time difference information generating means generates the time difference information based on the corrected clock number information, providing correct time indicated in the time difference information. In addition, since the time difference information is correct, the internal time information indicates correct time.

This allows the internal time information generating means to generate correct internal time information even if the drift occurs.

In order to achieve the above object, a terminal apparatus control method according to a fifth aspect of the invention includes the steps of: receiving an external timing signal constituted by external events generated at predetermined time intervals measured by times of positioning satellites by means of a terminal apparatus comprising positioning means for positioning based on satellite signals from the positioning satellites, communicating means, terminal timing signal generating means for generating a terminal timing signal constituted by internal events generated at predetermined time intervals, and clock generating means for generating predetermined number of clocks per unit time and recording generated number of clocks, receiving transmitting time information which indicates times when the external events are transmitted measured by times of the positioning satellites by means of the terminal apparatus, generating interevents clock number information which indicates the number of clocks between reception of the external events of the external timing and generation of the internal events of the terminal timing signal by means of the terminal apparatus, generating time difference information which indicates times between reception of the external events and generation of the internal events based on the interevents clock number information by means of the terminal apparatus, and generating internal time information which indicates times when the internal events are generated based on the transmitting time information and the time difference information by means of the terminal apparatus.

With the structure according to the fifth aspect of the invention, as with the structure according to the third aspect of the invention, the terminal apparatus can obtain time information with high time accuracy even though there is no need for the terminal apparatus to provide specific hardware.

In order to achieve the above object, a control program for a terminal apparatus according to a sixth aspect of the invention instructs a computer to perform the steps of: receiving an external timing signal constituted by external events generated at predetermined time intervals measured by times of positioning satellites by means of a terminal apparatus comprising positioning means for positioning based on satellite signals from the positioning satellites, communicating means, terminal timing signal generating means for generating a terminal timing signal constituted by internal events generated at predetermined time intervals, and clock generating means for generating predetermined number of clocks per unit time and recording generated number of clocks, receiving transmitting time information which indicates times when the external events are transmitted measured by times of the positioning satellites by means of the terminal apparatus, generating interevents clock number information which indicates the number of clocks between reception of the external events of the external timing signal and generation of the internal events of the terminal timing signal by means of the terminal apparatus, generating time difference information which indicates times between reception of the external events and generation of the internal events based on the interevents clock number information by means of the terminal apparatus, and generating internal time information which indicates times when the internal events are generated based on the transmitting time information and the time difference information by means of the terminal apparatus.

In order to achieve the above object, a recording medium for storing a control program for a terminal apparatus according to a seventh aspect of the invention instructs a computer to perform the steps of: receiving an external timing signal constituted by external events generated at predetermined time intervals measured by times of positioning satellites by means of a terminal apparatus including positioning means for positioning based on satellite signals from the positioning satellites, communicating means, terminal timing signal generating means for generating a terminal timing signal constituted by internal events generated at predetermined time intervals, and clock generating means for generating predetermined number of clocks per unit time and recording generated number of clocks, receiving transmitting time information which indicates times when the external events are transmitted measured by times of the positioning satellites by means of the terminal apparatus, generating interevents clock number information which indicates the number of clocks between reception of the external events of the external timing and generation of the internal events of the terminal timing signal by means of the terminal apparatus, generating time difference information which indicates times between reception of the external events and generation of the internal events based on the interevents clock number information by means of the terminal apparatus, and generating internal time information which indicates times when the internal events are generated based on the transmitting time information and the time difference information by means of the terminal apparatus.

BRIEF DESCRIPTION OF THE DRAWINGS

The invention will be described with reference to the accompanying drawings, wherein like numbers reference like elements.

FIG. 2 schematically shows a main hardware structure of a server.

FIG. 3 schematically shows a main hardware structure of a terminal.

FIG. 5 schematically shows a main software structure of the terminal.

FIG. 6 illustrates an example of a server PPS and the like.

FIG. 7 illustrates an example of a transmitting time and the like.

DESCRIPTION OF EXEMPLARY EMBODIMENTS

Hereinafter, with reference to the drawings, the preferred exemplary embodiments of the invention will be described in detail.

The following embodiments are given various limitations that are preferable technically because they are the exemplary specific examples of the invention, however, the scope of the invention is not limited to these aspects unless there is a particular description to limit the invention in the following description.

First Embodiment

Figure 1:
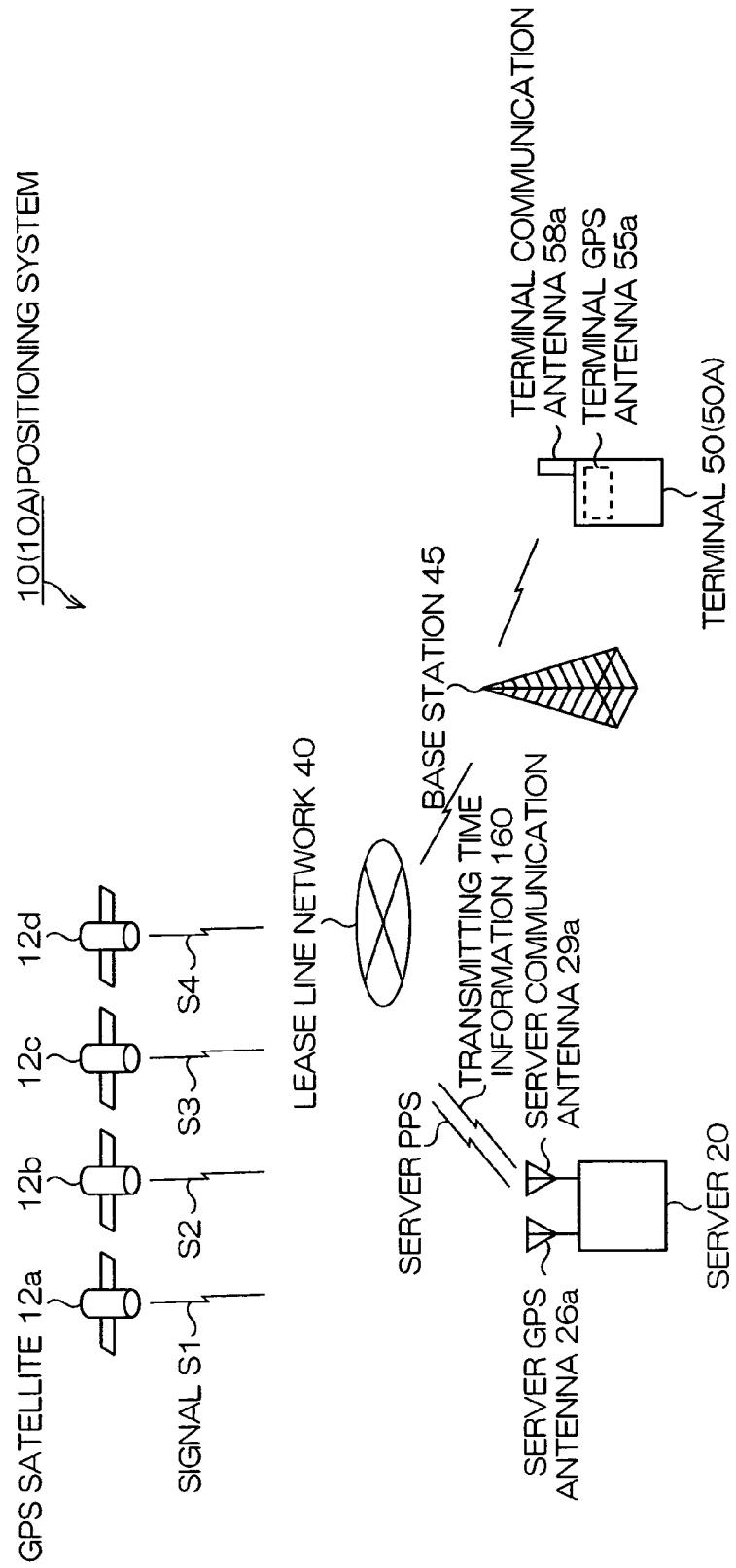
FIG. 1 schematically shows a positioning system in an embodiment according to the invention.

FIG. 1 schematically illustrates a positioning system 10 and the like according to a first embodiment of the invention.

As illustrated in FIG. 1, the positioning system 10 includes a terminal 50. The terminal 50 can receive signals S1, S2, S3 and S4 from positioning satellites such as GPS satellites 12a, 12b, 12c and 12d, and position based on the signals S1 and the like. The terminal 50 is an example of a terminal apparatus. The signals S1 and the like are an example of satellite signals.

The terminal 50 can receive signals from a server 20, which will be described later, via a terminal communication antenna 58a.

As illustrated in FIG. 1, the positioning system 10 includes the server 20. The server 20 can communicate with the terminal 50 via lease line network 40 and a base station 45. The server 20 is an example of an information supply apparatus.

The server 20 can receive the signals S1 and the like from the GPS satellites 12a and the like via a server GPS antenna 26a.

In addition, the server 20 can transmit server PPS (Pulses Per Second) and transmitting time information 160 via a server communication antenna 29a. The server PPS is configured with, for example, square waves (hereinafter, referred to as events) generated for every one second (s) measured by the times of the GPS satellites 12a and the like (hereinafter, referred to as GPS time). The intervals of one second (s) measured by the GPS time are an example of predetermined time intervals. The event of the server PPS is an example of external event. The server PPS is an example of external timing signals. The transmitting time information 160 is an example of transmitting time information.

In this embodiment, it is assumed that the server 20 and the terminal 50 are close to each other enough to practically ignore propagation delay of signals therebetween.

The terminal 20 maybe, for example, a cellular phone, a PHS (Personal Handy-phone System), PDA (Personal Digital Assistance) or the like, but not limited to these.

The number of GPS satellites 12a and the like is not limited to this embodiment, but may be three or five or more.

Main Hardware Structure of Server 20

FIG. 2 schematically illustrates a main hardware structure of the server 20.

As illustrated in FIG. 2, the server 20 includes a computer, which is equipped with a bus 21.

A CPU (Central Processing Unit) 22, a storage apparatus 23, an external storage apparatus 24, and the like are connected with the bus 21. The storage apparatus 23 may be a RAM (Random Access Memory), a ROM (Read Only Memory), or the like. The external storage apparatus 24 may be a HDD (Hard Disk Drive) or the like.

An input apparatus 25 for inputting each information, a server GPS apparatus 26, a server clocking apparatus 27, and the like are also connected with the bus 21. The server clocking apparatus 27 includes a server PPS generating apparatus 28. The server PPS generating apparatus 28 is used to generate the above-mentioned server PPS. In other words, the server PPS generating apparatus 28 is an example of external timing signal generating means. As described later, the server PPS is a pulse signal for every one second (s) measured by the GPS time. In addition, the time clocked by the server clocking apparatus 27 is held so that there is no difference from the GPS time.

Accordingly, the server 20 can obtain information which indicates the correct time at which a certain event of the server PPS is generated using the server clocking apparatus 27.

In this specification, representations that time accuracy is high and time is correct mean that deviation from the GPS time is small. In addition, representation that time period is correct means that deviation from the time period measured based on the GPS time is small.

A server communication apparatus 29 and a display apparatus 30 for displaying each information and the like are also connected with the bus 21.

Main Hardware Structure of Terminal 50

FIG. 3 schematically illustrates a main hardware structure of the terminal 50.

As illustrated in FIG. 3, the terminal 50 includes a computer, which is equipped with a bus 51.

A CPU 52, a storage apparatus 53, an input apparatus 54, a terminal GPS apparatus 55, a terminal clocking apparatus 56, and the like are connected with the bus 51. The terminal clocking apparatus 56 includes a terminal PPS generating apparatus 57. The terminal PPS generating apparatus 57 is used to generate terminal PPS configured with events generated at the time intervals for every one second (s). One second is an example of predetermined time intervals. The events generated by the terminal PPS generating apparatus 57 are an example of internal events. The terminal PPS is an example of terminal timing signals. The terminal PPS generating apparatus 57 is an example of terminal timing signal generating means. The terminal PPS is a timing signal within the terminal. However, the terminal PPS is not limited to a pulse signal at the intervals of one second of the GPS time. In addition, the time clocked by the terminal clocking apparatus 56 is not limited to be held so that there is no difference from the GPS time.

Accordingly, the terminal 50 cannot obtain information which indicates the correct time at which a certain event of the terminal PPS is generated depending on the terminal clocking apparatus 56.

A time difference counting apparatus 58 is also connected with the bus 51. The time difference counting apparatus 58 is used to generate predetermined number of clocks per unit time and record the number of generated clocks. The time difference counting apparatus 58 is an example of clock generating means. The time difference counting apparatus 58 is set to 54.912 MHz based on one second of the GPS time.

A terminal communication apparatus 59 for communicating with the server 20 and a display apparatus 60 are also connected with the bus 51. The terminal communication apparatus 59 is an example of communicating means.

The terminal 50 receives the server PPS and transmitting time information 160 (see FIG. 4) using the terminal communication apparatus 59. In other words, the terminal communication apparatus 59 is an example of external timing signal receiving means, and is also an example of transmitting time information receiving means.

Main Software Structure of Server 20

Figure 4:
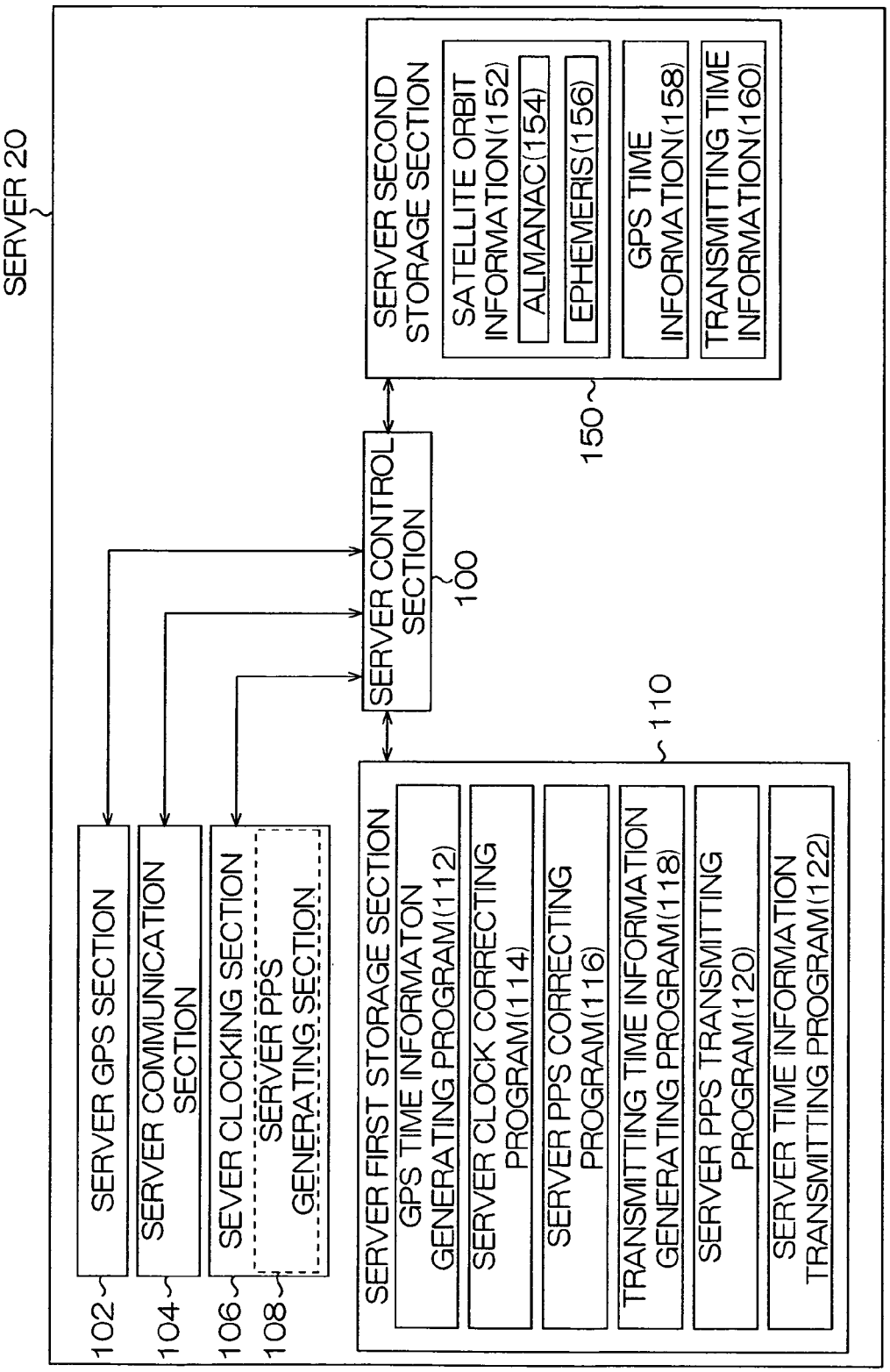
FIG. 4 schematically shows a main software structure of the server.

FIG. 4 schematically illustrates a main software structure of the server 20.

As illustrated in FIG. 4, the server 20 includes a server control section 100 for controlling each section, a server GPS section 102 corresponding to the server GPS apparatus 26 in FIG. 2, a server communicating section 104 corresponding to the server communication apparatus 29, a server clocking section 106 corresponding to the server clocking apparatus 27, a server PPS generating section 108 corresponding to the server PPS generating apparatus 28 and the like.

The server 20 also includes a server first storage section 110 for storing each program and a server second storage section 150 for storing each information.

As illustrated in FIG. 4, the server 20 stores satellite orbit information 152 in the server second storage section 150. The satellite orbit information 152 includes almanac 154 and ephemeris 156.

The almanac 154 is information which indicates rough orbits of all GPS satellites 12a and the like (see FIG. 1). The almanac 154 can be obtained by decoding the signals S1 and the like from any of the GPS satellites 12a and the like. The almanac 154 is valid for seven days, for example. Thus, the server 20 updates the almanac 154 every seven days.

The ephemeris 156 is information which indicates accurate orbits of each of the GPS satellites 12a and the like (see FIG. 1). For example, in order to obtain the ephemeris 156 of the GPS satellite 12a, the signal S1 from the GPS satellite 12a must be received, and decoded. The ephemeris 156 is valid for four hours (h), for example. Thus, the server 20 updates the ephemeris 156 every four hours (h).

As illustrated in FIG. 4, the server 20 stores a GPS time information generating program 112 in the server first storage section 110. The GPS time information generating program 112 is a program that the server control section 100 generates GPS time information 158. In other words, the GPS time information generating program 112 and the server control section 100 are an example of satellite time information generating means.

More specifically, the server control section 100 calculates the position of the server 20 and the time error of the server clocking section 106 based on the signals S1 and the like received by the server GPS section 102, and then generates the GPS time information 158 based on the time error and the times of the server clocking section 106.

The server control section 100 stores the GPS time information 158 in the server second storage section 150.

As illustrated in FIG. 4, the server 20 stores a server clock correcting program 114 in the server first storage section 110. The server clock correcting program 114 is a program that the server control section 100 corrects the times of the server clocking section 106 based on the GPS time information 158 so that there is no difference from the GPS time. In other words, the server clock correcting program 114 and the server control section 100 are an example of time correcting means.

As illustrated in FIG. 4, the server 20 stores a server PPS correcting program 116 in the server first storage section 110. The server PPS correcting program 116 is a program that the server control section 100 corrects the timing of generating events P1 and the like of the server PPS (see FIG. 6) based on the GPS time information 158. In other words, the server PPS correcting program 116 and the server control section 100 are an example of external timing signal correcting means.

More specifically, the server control section 100 controls the server PPS generating section 108 so that the events P1 and the like are generated for every one second measured by the GPS time.

As illustrated in FIG. 4, the server 20 stores a transmitting time information generating program 118 in the server first storage section 110. The transmitting time information generating program 118 is a program that the server control section 100 generates transmitting time information 160 which indicates the GPS time at which a certain event P1 or the like is transmitted. In other words, the transmitting time information generating program 118 and the server control section 100 are an example of transmitting time information generating means.

For example, the server control section 100 generates the transmitting time information 160 which indicates time ts1 (see FIG. 6) at which the event P1 is transmitted using the server clocking section 106 synchronized with the GPS time.

The server control section 100 stores the generated transmitting time information 160 in the server second storage section 150.

As illustrated in FIG. 4, the server 20 stores a server PPS transmitting program 120 in the server first storage section 110. The server PPS transmitting program 120 is a program that the server control section 100 transmits the server PPS to the terminal 20. In other words, the server PPS transmitting program 120 and the server control section 100 are an example of external timing signal transmitting means.

As illustrated in FIG. 4, the server 20 stores a server time information transmitting program 122 in the server first storage section 110. The server time information transmitting program 122 is a program that the server control section 100 transmits the transmitting time information 160 to the terminal 50. In other words, the server time information transmitting program 122 and the server control section 100 are an example of transmitting time information transmitting means.

It should be noted that the server 20 transmits to multiple terminals including the terminal 20 using a protocol such as UDP (User Datagram Protocol).

Main Software Structure of Terminal 50

FIG. 5 schematically illustrates a main software structure of the terminal 50.

As illustrated in FIG. 5, the terminal 50 includes a terminal control section 200 for controlling each section, a terminal GPS section 202 corresponding to the terminal GPS apparatus 55 in FIG. 3, a terminal communicating section 204 corresponding to the terminal communication apparatus 59, a terminal clocking section 206 corresponding to the terminal clocking apparatus 56, a terminal PPS generating section 207 corresponding to the terminal PPS generating apparatus 57, a time difference counting section 208 corresponding to the time difference counting apparatus 58, and the like.

The terminal 50 also includes a terminal first storage section 210 for storing each program and a terminal second storage section 250 for storing each information.

As illustrated in FIG. 5, the terminal 50 stores satellite orbit information 252 in the terminal second storage section 250. The satellite orbit information 252 includes almanac 254 and ephemeris 256.

As illustrated in FIG. 5, the terminal 50 stores a positioning program 212 in the terminal first storage section 210. The positioning program 212 is a program that the terminal control section 200 controls the terminal GPS section 202 so as to receive the signal S1 and the like, and generates current position information 258 which indicates the current position based on the signals S1 and the like.

The current position information 258 is an information which indicates the current position defined by, for example, a latitude, a longitude, and an altitude.

The terminal control section 200 stores the generated current position information 258 in the terminal second storage section 250.

As illustrated in FIG. 5, the terminal 50 stores a server PPS receiving program 214 in the terminal first storage section 210. The server PPS receiving program 214 is a program that the terminal control section 200 controls the terminal communicating section 204 so as to receive the server PPS. In other words, the server PPS receiving program 214, the terminal control section 200, and the terminal communicating section 204 are an example of external timing signal receiving means.

As illustrated in FIG. 5, the terminal 50 stores a transmitting time information receiving program 216 in the terminal first storage section 210. The transmitting time information receiving program 216 is a program that the terminal control section 200 controls the terminal communicating section 204 so as to receive the transmitting time information 160 (see FIG. 4). In other words, the transmitting time information receiving program 216, the terminal control section 200, and the terminal communicating section 204 are an example of transmitting time information receiving means.

The terminal control section 200 stores the received transmitting time information 160 in the terminal second storage section 250 as terminal side transmitting time information 260.

As illustrated in FIG. 5, the terminal 50 stores a clock number information generating program 218 in the terminal first storage section 210. The clock number information generating program 218 is a program that the terminal control section 200 generates clock number information 262 which indicates clock numbers dC generated by the time difference counting apparatus 58 (see FIG. 3) at the time intervals between reception of a certain event of the server PPS and generation of an event of the terminal PPS. The clock number information 262 is an example of interevents clock number information. The clock number information generating program 218 and the terminal control section 200 are an example of interevents clock number information generating means.

More specifically, the terminal control section 200 controls for starting and stopping operation of the time difference counting apparatus 58 (see FIG. 3), and generates the clock number information 262 which indicates the clock numbers dC generated between starting and stopping operation of the time difference counting apparatus 58.

For example, the terminal control section 200 starts operation of the time difference counting apparatus 58 when an event of the server PPS is received, and stops it when an event of the terminal PPS is received immediately after that. In addition, the terminal control section 200 starts operation of the time difference counting apparatus 58 when an event of the terminal PPS is received, and stops it when an event of the server PPS is received immediately after that.

In short, the terminal control section 200 starts operation of the time difference counting apparatus 58 when an event of the server PPS or the terminal PPS is received, and stops it when an event of the terminal PPS or the server PPS is received immediately after that.

FIG. 6 illustrates server PPS and the like.

The terminal control section 200 starts operation of the time difference counting apparatus 58 when the event P1 of the server PPS is received, and stops it when an event Q1 of the terminal PPS is received immediately after that.

For example, the time difference counting apparatus 58 starts operation, generates clocks and records the number of clocks between the time at which the event P1 of the server PPS in FIG. 6 is received and the time at which the event Q1 of the terminal PPS is received. The terminal control section 200 then obtains the clock number information 262 which indicates the clock numbers dC from the time difference counting apparatus 58.

The terminal control section 200 stores the generated clock number information 262 in the terminal second storage section 250.

As illustrated in FIG. 5, the terminal 50 stores a time difference information generating program 220 in the terminal first storage section 210. The time difference information generating program 220 is a program that the terminal control section 200 generates time difference information 264 which indicates the time period (time difference) dt between reception of a certain event of the server PPS and generation of an event of the terminal PPS based on the clock number information 262. The time difference information 264 is an example of time difference information. The time difference information generating program 220 and the terminal control section 200 are an example of time difference information generating means.

For example, assuming that frequency Hi of the time difference counting apparatus 58 is 54.912 MHz, one clock (clock interval) is 18.21 nsec (ns). Accordingly, the terminal control section 200 multiples the clock numbers dC by 18.21 nsec (ns), and generates the time difference information 264 which indicates the time difference dt. The accuracy of the time difference information 264 is clock interval of 18.21 nsec.

The terminal control section 200 stores the generated time difference information 264 in the terminal second storage section 250.

As illustrated in FIG. 5, the terminal 50 stores a terminal time information generating program 222 in the terminal first storage section 210. The terminal time information generating program 222 is a program that the terminal control section 200 generates terminal time information 266 which indicates, for example, terminal time tm which is the time at which the event Q1 of the terminal PPS is generated based on the terminal side transmitting time information 260 and the time difference information 264. The terminal time tm is an example of internal times. The terminal time information generating program 222 and the terminal control section 200 are an example of internal time information generating means.

FIG. 7 illustrates terminal time tm and the like.

The terminal control section 200 adds, for example, the time difference dt to the transmitting time ts1, and then calculates the terminal time tm. Since propagation delay can be ignored, as mentioned above, it is assumed that, for example, the time at which the server 20 transmits the event P1 of the server PPS (see FIG. 6) is the time at which the terminal 50 receives the event P1.

The terminal control section 200 stores the generated terminal time information 266 in the terminal second storage section 250.

The positioning system 10 is configured as described above.

As mentioned above, the server 20 can correct the timing of generating the server PPS generated by the server PPS generating apparatus 28 (see FIG. 2) based on the GPS time information 158 (see FIG. 4) so as to generate events of the server PPS for every one second (s) measured by the GPS time.

In addition, the server 20 can generate the transmitting time information 160 (see FIG. 4) which indicates the GPS times corresponding to certain events of the server PPS, respectively.

The server 20 can then transmit the server PPS and the transmitting time information 160 to the terminal 50.

On the other hand, the terminal 50 can receive the server PPS and the transmitting time information 160.

The terminal 50 can then generate the clock number information 262 (see FIG. 5) which indicates the number of clocks between reception of certain external events of the server PPS and generation of events of the terminal PPS.

The terminal 50 can then generate the time difference information 264 (see FIG. 5) based on the clock number information 262. The time difference information 264 indicates time period between reception of the certain events of the server PPS and generation of the events of the terminal PPS. This means that, for example, an event of the terminal PPS is generated at the time point when the time difference dt, which is the time period indicated in the time difference information 264, has elapsed after receiving a certain event of the server PPS. Accordingly, if the times at which certain events of the server PPS are received are already known, the times at which events of the terminal PPS are generated can be calculated based on the times and the time difference information 264.

At this point, as mentioned above, the terminal 50 can receive the transmitting time information 160 from the server 20. The transmitting time information 160 indicates the GPS times at which certain events of the server PPS are transmitted. Here, in this embodiment, the terminal 50 and the server 20 are close to each other enough to assume that the time at which a certain event of the server PPS is received and the time at which that event is transmitted are the same, allowing ignoring of propagation delay therebetween. Accordingly, it is assumed that the transmitting time tsl indicated in the terminal side transmitting time information 260 is the time at which the terminal 50 receives a certain event of the server PPS.

The terminal 50 can then generate the terminal time information 266 (see FIG. 5) which indicates times at which events of the terminal PPS are generated based on the terminal side transmitting time information 260 and the time difference information 264.

The time difference information 264 can provide the time accuracy equivalent to that of the GPS time by increasing the number of clocks per unit time of the time difference counting apparatus 58.

Accordingly, times indicated in the terminal time information 266 provide the accuracy equivalent to the GPS time.

Here, since the server 20 can transmit the above-mentioned server PPS and the transmitting time information 160 by putting on the radio waves of cellular phone network, for example, the terminal 50 can receive them using the terminal communication apparatus 59, and there is no need to provide specific hardware.

Accordingly, the positioning system 10 allows the terminal 50 to receive time information with high time accuracy even though there is no need to provide specific hardware to receive correct clocks and standard radio waves.

The terminal 50 can use the highly accurate terminal time information 266 for positioning.

As mentioned above, the error range of the time difference information 264 is clock interval, 18.21 nsec (ns), for example. If the distance between the terminal 50 and the server 20 is three kilometers (km), for example, propagation delay is approximately 0.01 msec (ms). Therefore, the error range of the terminal time information 266 is sum of approximately 18.21 nsec (ns) and 0.01 msec (ms). On the other hand, a positioning code such as the C/A code putted on the signal S1 from the GPS satellite 12a or the like is configured with 1,023 chips, and transmitted for every 1 msec (ms).

As mentioned above, the error range of the terminal time information 266 is smaller enough than the intervals of transmitting the C/A code. This allows the terminal 50 to identify the C/A code rapidly.

Further, the error range of the terminal time information 266 is smaller enough than the intervals of transmitting the C/A code, allowing further rapid identification of the C/A code by analyzing a part of the C/A code. For example, the terminal 50 can identify the C/A code by analyzing ten chips, which are parts of 1,023 chips constituting the C/A code. This allows reduction in time required for identifying the C/A code 10/1023rd less than the case of analyzing all chips constituting the C/A code.

In addition, since the terminal 50 has correct terminal time information 266 prior to positioning, the time error of the terminal 50 itself has already been known in positioning. This decreases one of unknowns for positioning, allowing the terminal 50 to reduce positioning time.

The structure of the positioning system 10 in the embodiment according to the invention is described above. The operation example is hereinafter described mainly using FIG. 8.

Figure 8:
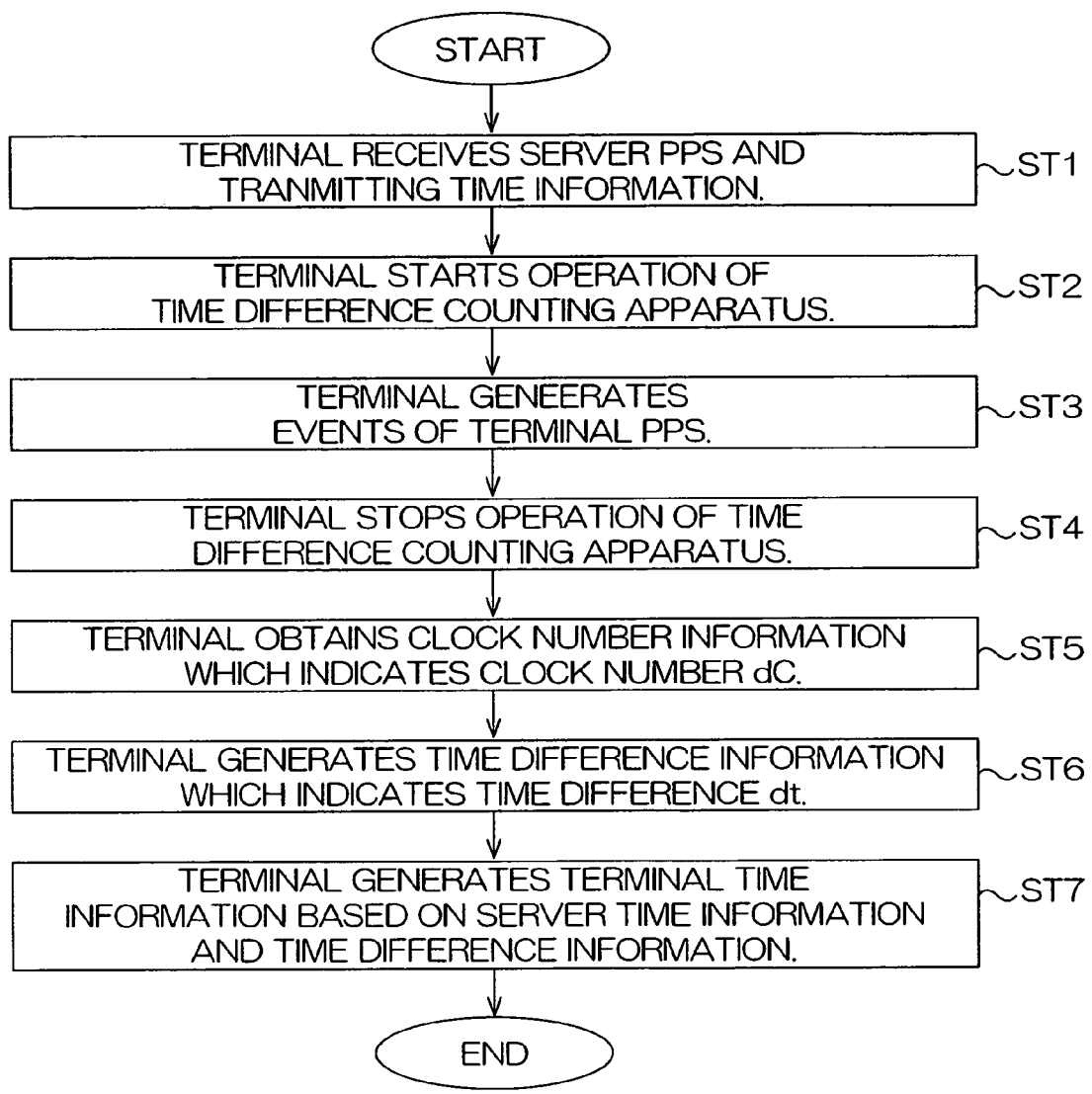
FIG. 8 schematically shows a flowchart of an operation example of the positioning system.

FIG. 8 schematically illustrates a flowchart of an operation example of the positioning system 10.

First, the terminal 50 receives a server PPS and transmitting time information 160 from the server 20 (step ST1 in FIG. 8). The step ST1 is an example of the step of receiving an external timing signal, and also is an example of the step of receiving transmitting time information.

Subsequently, the terminal 50 starts operation of the time difference counting apparatus 58 (see FIG. 3) (step ST2).

The terminal 50 then generates events of the terminal PPS (step ST3).

Afterwards, the terminal 50 stops operation of the time difference counting apparatus 58 (step ST4).

The terminal 50 then generates the clock number information 262 (see FIG. 5) (step ST5).

The above-mentioned steps ST2 through ST5 are an example of the step of generating interevents clock number information.

Next, the terminal 50 generates the time difference information 264 (see FIG. 5) (step ST6). The step ST6 is an example of the step of generating time difference information.

Subsequently, the terminal 50 generates the terminal time information 266 (see FIG. 5) (step ST7). The step ST7 is an example of the step of generating internal time information.

As mentioned above, the positioning system 10 allows the terminal 50 to obtain time information with high time accuracy even though there is no need to provide specific hardware.

Second Embodiment

Next, a positioning system 10A (see FIG. 1) according to a second embodiment is described. Since the structure of the positioning system 10A in the second embodiment is almost the same as that of the above-mentioned positioning system 10 in the first embodiment, the same reference numerals are used for the same or similar parts, and description thereof is thus omitted. The differences are hereinafter mainly described.

It is different from the terminal 50 in the first embodiment in that a terminal 50A in the positioning system 10A in the second embodiment calculates drift of a time difference counting apparatus 58 (see FIG. 3). Here, drift refers change in oscillation frequencies due to change in temperatures.

The terminal 50A can obtain further highly accurate time information by calculating drift of the time difference counting apparatus 58.

Figure 9:
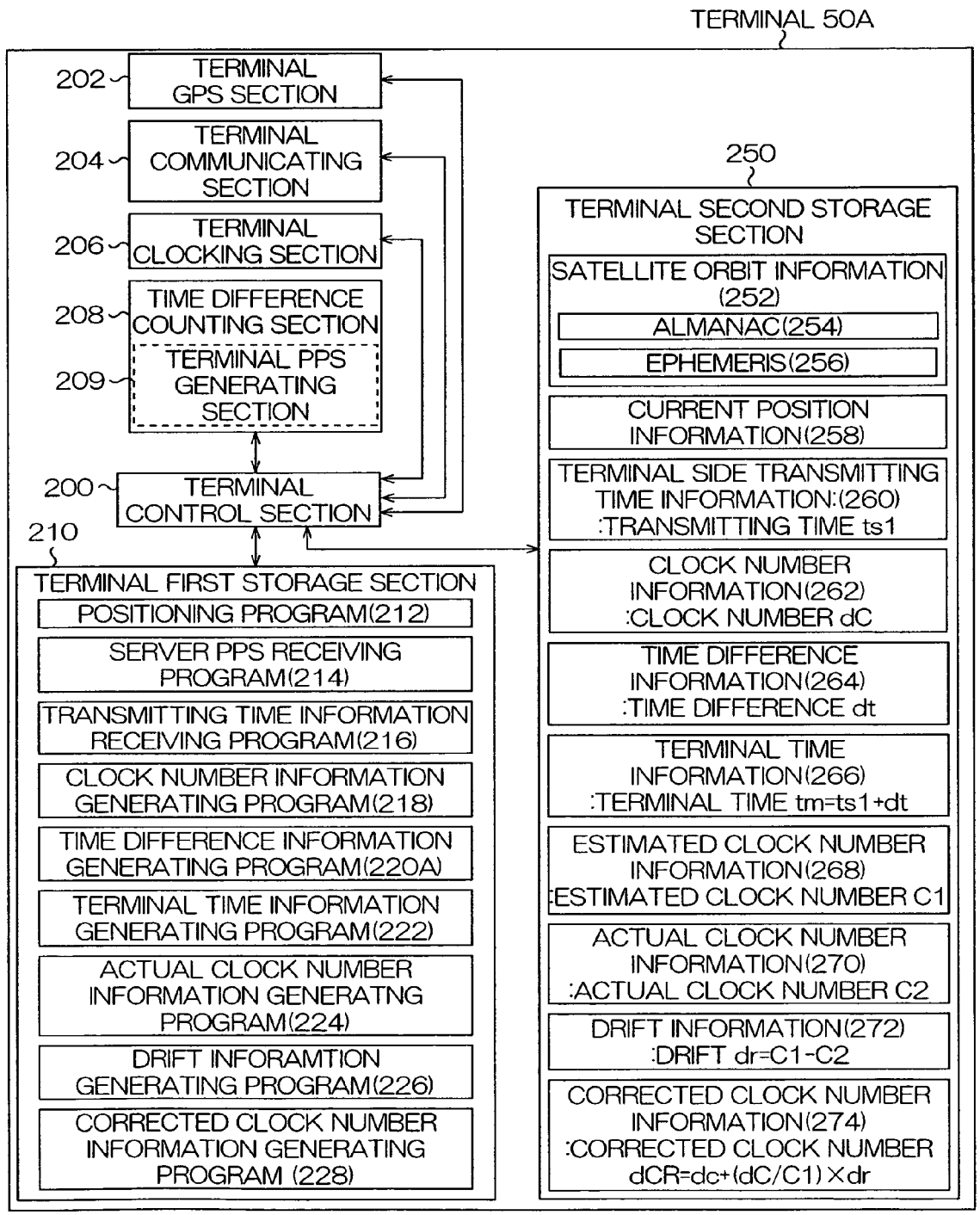
FIG. 9 schematically shows a main software structure of the terminal.

FIG. 9 schematically illustrates a main software structure of the terminal 50A.

Figure 10:
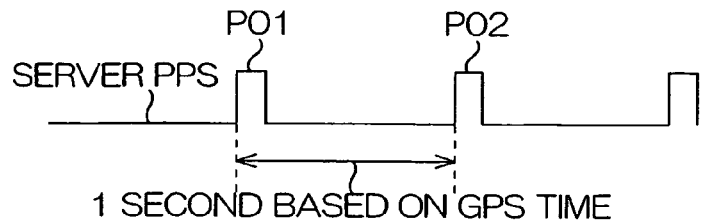
FIG. 10 schematically shows an example of the server PPS.

FIG. 10 illustrates server PPS and the like.

As illustrated in FIG. 9, the terminal 50A stores estimated clock number information 268 which indicates estimated clock number C1 in a terminal second storage section 250. The estimated clock number information 268 indicates estimated clock number to be generated during one second (s) of the GPS time, that is, during receiving sequential two events of the server PPS under the condition that no drift occurs.

As illustrated in FIG. 9, the terminal 50A stores an actual clock number information generating program 224 in a terminal first storage section 210. The actual clock number information generating program 224 is a program that the terminal control section 200 generates actual clock number information 270 which indicates actual clock number C2 during reception of sequential two events of the server PPS by the terminal control section 200. In other words, the actual clock number information generating program 224 and the terminal control section 200 are an example of actual clock number information generating means.

For example, the terminal control section 200 starts operation of the time difference counting apparatus 58 when a certain event P01 of the server PPS is received, and stops it when a subsequent event P02 is received.

The terminal control section 200 then obtains the actual clock number information 270 which indicates the number of clocks between the event P01 and the subsequent event P02 from the time difference counting apparatus 58. Since the server PPS is a timing signal generated for every one second (s) of the GPS time, the actual clock number information 270 indicates the actual clock number during one second (s) of the GPS time.

As illustrated in FIG. 9, the terminal 50A stores a drift information generating program 226 in the terminal first storage section 210. The drift information generating program 226 is a program that the terminal control section 200 generates drift information 272 which indicates drift dr of the time difference counting apparatus 58 (see FIG. 3) based on the estimated clock number information 268 and the actual clock number information 270. In other words, the drift information generating program 226 and the terminal control section 200 are an example of drift information generating means.

More specifically, as illustrated in FIG. 10, the terminal control section 200 subtracts the actual clock number C2 from the estimated clock number C1, thereby calculating the drift dr.

The terminal control section 200 stores the generated drift information 272 in the terminal second storage section 250.

As illustrated in FIG. 9, the terminal 50A stores a corrected clock number information generating program 228 in the terminal first storage section 210. The corrected clock number information generating program 228 is a program that the terminal control section 200 corrects the clock number information 262 based on the drift information 272, and then generates corrected clock number information 274 which indicates corrected clock number dCR. In other words, the corrected clock number information generating program 228 and the terminal control section 200 are an example of corrected clock number information generating means.

More specifically, the terminal control section 200 calculates the corrected clock number dCR based on the equation $dCR=dC+(dC/C1) \times dr$, and then generates the corrected clock number information 274.

The corrected clock number information 274 indicates the number of clocks in the case where no drift occurs in the time difference counting apparatus 58 (see FIG. 3).

The terminal control section 200 generates the time difference information 264 based on the corrected clock number information 274 using a time difference information generating program 220A.

As mentioned above, the corrected clock number information 274 indicates the number of clocks in the case where no drift occurs in the time difference counting apparatus 58 (see FIG. 3).

Accordingly, the correct time difference information 264 can be generated by multiplying the corrected clock number dCR by clock interval, for example, 18.21 ns.

Since the time difference information 264 is correct, the terminal time information 266 also becomes correct information.

The structure of the positioning system 10A in the embodiment according to the invention is described above. The operation example is hereinafter described mainly using FIGS. 11 and 12.

Figure 11:
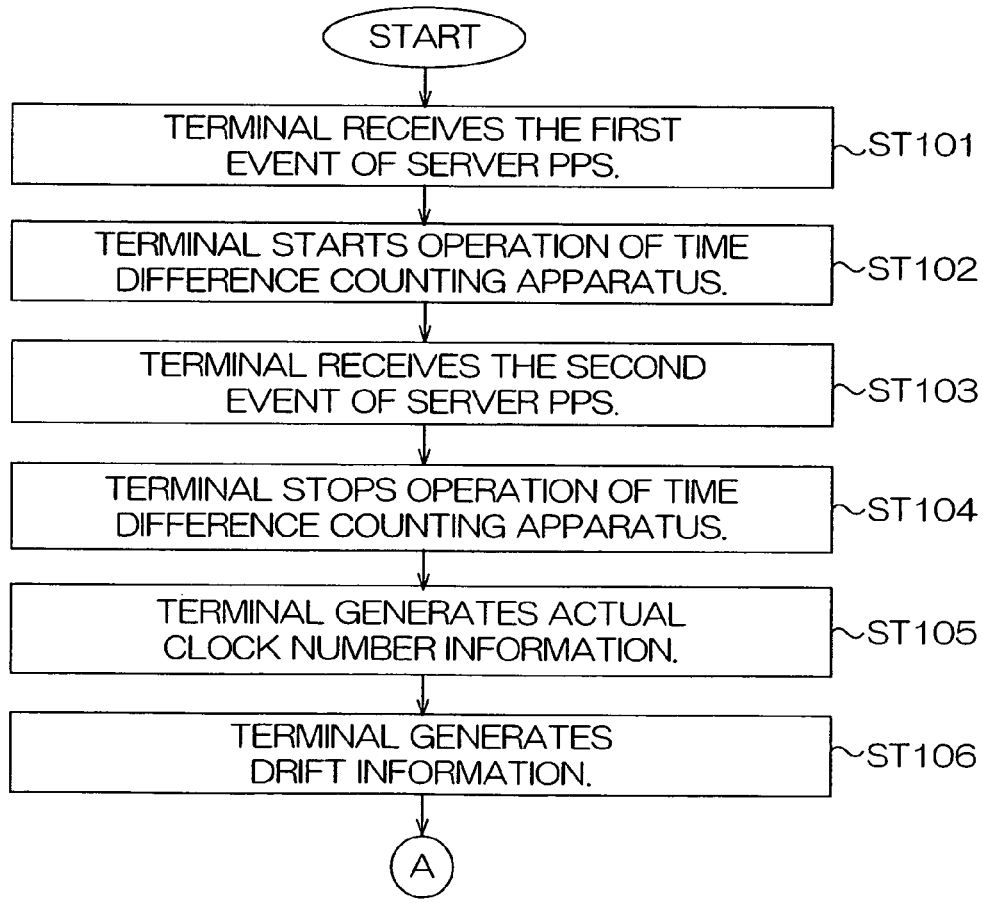
FIG. 11 schematically shows a flowchart of an operation example of the positioning system.
Figure 12:
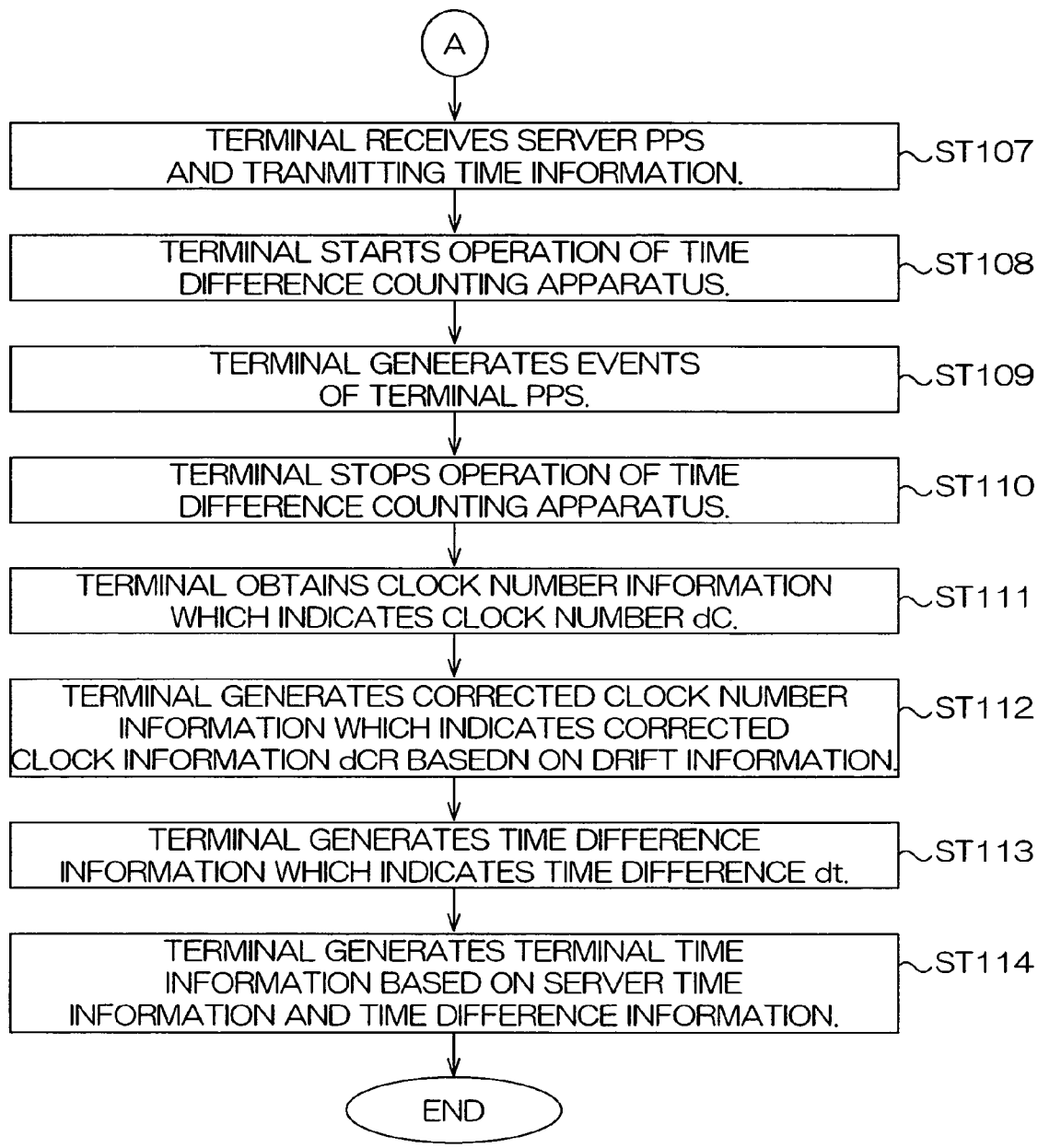
FIG. 12 schematically shows a flowchart of an operation example of the positioning system.

FIGS. 11 and 12 schematically illustrate flowcharts of an operation example of the positioning system 10A.

First, the terminal 20A receives a certain event P01 of the server PPS (see FIG. 10) (step ST101 in FIG. 11).

Subsequently, the terminal 20A starts operation of the time difference counting apparatus 58 (step ST102).

Afterwards, the terminal 20A receives an event P02 of the server PPS following the event P01 (see FIG. 10) (step ST103).

The terminal 20A then stops operation of the time difference counting apparatus 58 (step ST104).

Next, the terminal 20A generates the actual clock number information 270 (step ST105).

The terminal 20A then generates the drift information 272 (step ST106).

The steps ST107 through ST111 in FIG. 12 are the same as the steps ST1 through ST5 in the first embodiment (see FIG. 8), description thereof is thus omitted.

Following the step ST111, the terminal 20A generates the corrected clock number information 274 (see FIG. 9) (step ST112 in FIG. 12).

Afterwards, the terminal 20A generates the time difference information 264 based on the corrected clock number information 274.

As mentioned above, the corrected clock number information 274 indicates the number of clocks in the case where no drift occurs in the time difference counting apparatus 58 (see FIG. 3).

Accordingly, further correct time difference information 264 can be generated by multiplying the corrected clock number dCR by clock interval, for example, 18.21 ns.

Since the time difference information 264 is correct, the terminal time information 266 also becomes further correct information.

Program and Computer Readable Recording Medium and the like

It is possible to provide a control program for a terminal apparatus, instructing a computer to perform the steps of receiving an external timing signal, receiving transmitting time information, generating interevents clock number information, generating time difference information, generating internal time information and the like of the above-mentioned operation example.

It is also possible to provide a computer readable recording medium and the like on which such control program and the like for the terminal apparatus are recorded.

A program storing medium used to install such control program and the like for the terminal apparatus on the computer, and enable them to be performed by the computer may be not only a package medium such as a flexible disc such as a floppy(R), a CD-ROM (Compact Disc Read Only Memory), a CD-R (Compact Disc Recordable), a CD-RW (Compact Disc-Rewritable), a DVD (Digital Versatile Disc) or the like, but also a semiconductor memory, a magnetic disc, or a magnetic optical disc in which a program is temporarily or permanently stored.

The present invention is not limited to the above-described respective embodiments. Further, the above-described respective embodiments may be combined with each other.

What is claimed is:

1. A terminal apparatus for positioning based on satellite signals from positioning satellites, the terminal apparatus comprising:

an external signal receiving section that receives an external signal that is generated at predetermined time intervals measured by times of the positioning satellites;

a transmitting time information receiving section that receives transmitting time information relating to the external signal;

a terminal clocking section that has a time error with respect to the times of the positioning satellites;

a terminal signal generating section that generates a terminal signal at the predetermined time intervals measured by the terminal clocking section;

a clock generating section that generates a predetermined number of clocks per unit time;

a clock number information generating section that generates clock number information that indicates the number of clocks generated by the clock generating section between reception of the external signal and generation of the terminal signal; and a time information generating section that generates generating time information relating to the terminal signal based on the clock number information and the transmitting time information, the clock number information generating section starting operation of the clock generating section when the external signal is received, and stopping operation of the clock generating section when the terminal signal is generated, or starting operation of the clock generating section when the terminal signal is generated, and stopping operation of the clock generating section when the external signal is received.

2. A control method of a terminal apparatus for positioning based on satellite signals from positioning satellites, the terminal apparatus including a terminal clocking section that has a time error with respect to times of the positioning satellites and a clock generating section that generates a predetermined number of clocks per unit time, the method comprising:

receiving an external signal that is generated at predetermined time intervals measured by the times of the positioning satellites;

receiving transmitting time information relating to the external signal;

generating a terminal signal at the predetermined time intervals measured by the terminal clocking section;

generating clock number information that indicates the number of clocks generated by the clock generating section between reception of the external signal and generation of the terminal signal; and generating generating time information relating to the terminal signal based on the clock number information and the transmitting time information, the generating of the clock number information including starting operation of the clock generating section when the external signal is received, and stopping operation of the clock generating section when the terminal signal is generated, or starting operation of the clock generating section when the terminal signal is generated, and stopping operation of the clock generating section when the external signal is received.

3. A computer readable recording medium storing a control program for a terminal apparatus for positioning based on satellite signals from positioning satellites, the terminal apparatus including a computer, a terminal clocking section that has a time error with respect to times of the positioning satellites, and a clock generating section that generates a predetermined number of clocks per unit time, the control program causing the computer to implement:

a function that receives an external signal that is generated at predetermined time intervals measured by the times of the positioning satellites;

a function that receives transmitting time information relating to the external signal;

a function that generates a terminal signal at the predetermined time intervals measured by the terminal clocking section;

a function that generates clock number information that indicates the number of clocks generated by the clock generating section between reception of the external signal and generation of the terminal signal; and a function that generates generating time information relating to the terminal signal based on the clock number information and the transmitting time information, the function that generates the clock number information including starting operation of the clock generating section when the external signal is received, and stopping operation of the clock generating section when the terminal signal is generated, or starting operation of the clock generating section when the terminal signal is generated, and stopping operation of the clock generating section when the external signal is received.

* * * * *